United States Patent

[11] 3,561,792

[72] Inventor Izchak Cycowicz
   Brooklyn, N.Y.
[21] Appl. No. 789,549
[22] Filed Jan. 7, 1969
[45] Patented Feb. 9, 1971
[73] Assignee Super Sagless Spring Corp.
   Bayonne, N.J.
   a corporation of New York

[54] RIVET PIVOTED MEMBERS AND WASHERS THEREFOR
   5 Claims, 11 Drawing Figs.

[52] U.S. Cl. .................................................. 287/101,
   85/50
[51] Int. Cl. ........................................... F16c 11/00,
   F16b 43/00
[50] Field of Search ......................................... 85/50;
   308/N, 238, 135.2, 15, 22; 287/101

[56] References Cited
   UNITED STATES PATENTS
   827,480  7/1906  Traut ............................ 287/101X
   1,874,434  8/1932  Brown .......................... 287/101
   3,218,906  11/1965  Dupree ......................... 85/50

FOREIGN PATENTS
947,816  1/1964  Great Britain ................ 85/50
771,555  4/1957  Great Britain ................ 85/50
745,550  2/1956  Great Britain ................ 85/50
1,322,847  2/1963  France ......................... 85/50

Primary Examiner—David J. Williamowsky
Attorney—J. B. Felshin

ABSTRACT: A pair of metal members are connected by a rivet, with a washer on the rivet and disposed between said pivoted members. The washer is made of synthetic plastic, resilient, good wearing, low friction bearing material. The washer has an annular outer portion from which an inner thinner or finned portion projects inwardly to center the rivet, thereby providing more space for lubricating oil. The outer annular portion of the washer is cup-shaped or annularly sinuous to make the washer resilient. When used with a shouldered rivet, the centering finned portion centers on the smaller diameter portion of the rivet to prevent the rivet from becoming offset, as is the case with washers having a hole large enough to receive the large diameter part of the rivet. During the riveting process, the centering finned portion may be torn off by the shoulder of the rivet.

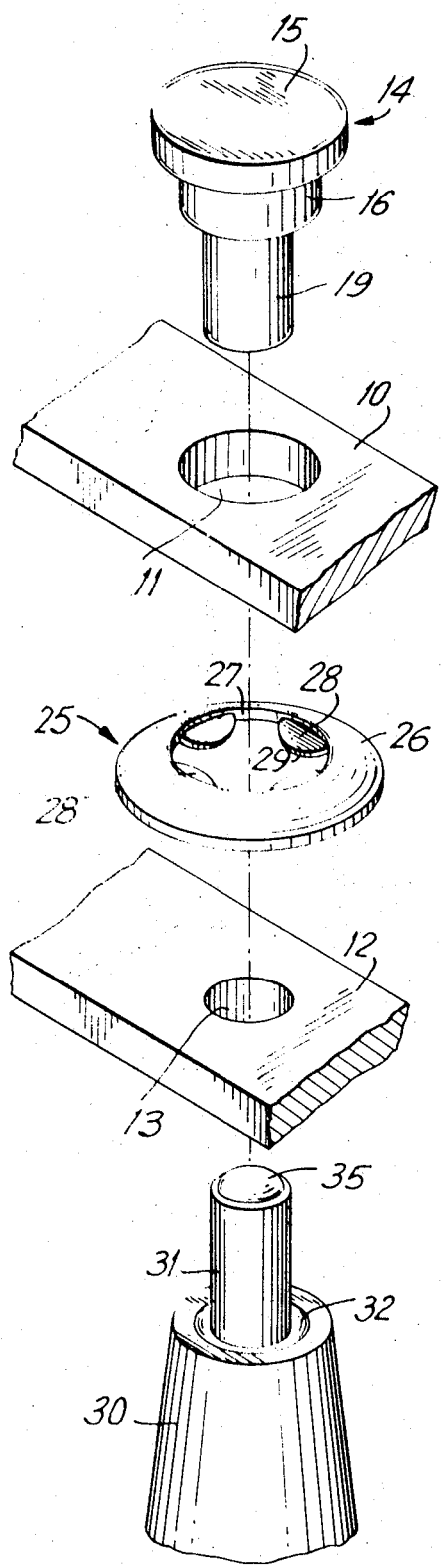
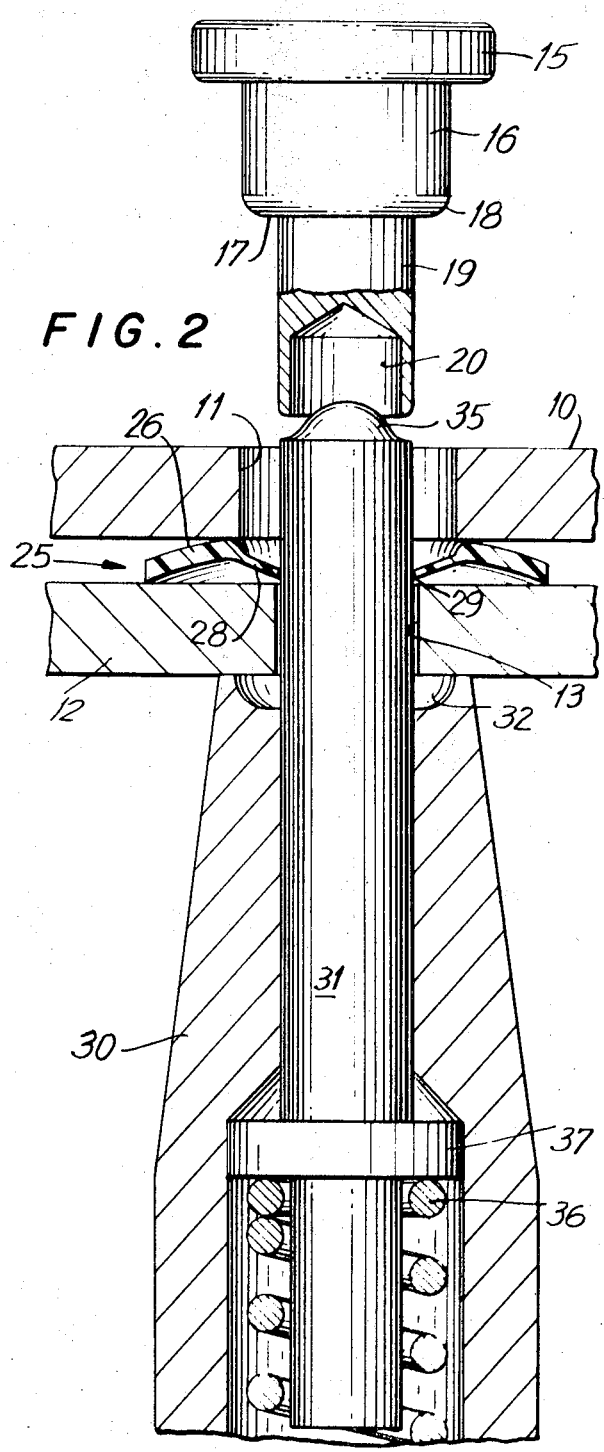

PATENTED FEB 9 1971 3,561,792

INVENTOR.
IZCHAK CYCOWICZ

BY
J.B. Felshin
ATTORNEY

RIVET PIVOTED MEMBERS AND WASHERS THEREFOR

BACKGROUND OF THE INVENTION

1. Field of the Invention

This invention relates to washers for members pivoted together by a pin or rivet to insure a space between the pivoted members, smooth bearing surface between said members, and to prevent sloppiness which causes swaying at the pivot point.

2. Description of the Prior Art

Links have been joined to each other in a linkage mechanism as for reclining chairs or sofa beds to provide a pivoted joint, by two basic methods. One method is with the use of straight semitubular rivets and the other is by the use of shoulder rivets.

When a semitubular straight rivet was used, the rivet could rotate relative to each of the links through which it passed. The slight clearance of the rivet in the holes of the two links often made the joint wabbly, unless both the head and curl of the rivet squeezed the two links to each other snuggly or with slight pressure. Solid straight rivets were impractical, because when staked to one of the links, the joint would not operate well since it was too hard to turn one link relative to the other. Washers were placed between the two links to surround the semitubular straight rivet. These washers performed the following functions:

1. they kept the links spaced apart so that they did not rub each other along their length to thereby impede movement of the links;
2. the washers created a smooth surface with a smaller coefficient of friction than the links themselves, which are made of steel and have rough burrs around the pierced holes which received the rivet;
3. the washers created some elasticity or springiness or resiliency between the links so that the links were snuggly held between the two heads of the rivet or the head and curl of the rivet, but with not too much solid force. The washers that have been used for this purpose only functioned fairly well when straight semitubular rivets of uniform diameter were used.

In the past a combination was used of two thin washers, one made of thin spring steel and having a curvature and the other made of thin nylon and flat. The steel washer was a spring washer. The nylon washer had a low coefficient of friction. The trouble with such construction is that it is costly to make two washers and also it is costly to apply two washers at each pivoted joint. Yet they are better than using only steel washers.

Later there was developed a less expensive method by utilizing one cupped plastic washer made of Celcon or other material that had the quality of springiness like a spring washer and a bearing surface comparable to a nylon washer. This single washer saved component costs since only one component was used, and the assembly was cheaper because only one washer was used instead of two.

When a shoulder rivet is used, the tenon is anchored to one link which has the smaller hole while the other link rotates on the larger diameter portion of the shoulder rivet. The upper link may have a certain amount of axial clearance in that the height from the lower link to the head of the rivet is greater than the thickness of the upper link. It is desirable to keep the two links apart, to thereby obtain freedom of movement between the two adjacent links, and to take out some of the sloppiness of the joint which causes swaying of one link relative to the other.

To keep the links apart and spaced from each other, a steel washer with a hole of the small diameter portion or tenon of a shoulder rivet was placed on the smaller diameter portion or tenon, engaging the underside of a shoulder of the rivet. This was a flat steel washer and no spring action to take out sloppiness was obtained; and also there was considerable friction involved. One way to obtain smoother bearing surface between the two adjacent links when using a shoulder rivet, and to take out sloppiness, was by using the combination of a curved spring steel washer with a flat nylon washer therebeneath, with an opening large enough to admit the large diameter portion of the shoulder rivet. The trouble with the use of this combination of washers was found to be that the washers are relatively thin and get easily trapped under the shoulder of the shoulder rivet during the assembly. Before the tenon is staked or anchored to the lower link the washer would slip off the large diameter portion of the shoulder rivet and shift sideways or become offset from the axis of the rivet and touch one side of the small diameter or tenon portion of the shoulder rivet. Such entrapment would often make the spring washer inoperative so as not to have any spring action. This was so because the spring washer would become confined and leave no room for spring action. A one piece combination spring and bearing Celcon washer would be entrapped also and would often crack during the entrapment while the tenon is being clinched or anchored to the lower link.

SUMMARY OF THE INVENTION

It is hence an object of the present invention to overcome the above-mentioned difficulties with prior devices.

Another object of this invention is to provide a washer which has an outer annular thicker portion from which there extends inwardly a thinner or finned portion through which the rivet passes thereby providing space adjacent to the rivet body for lubricant.

Yet another object of this invention is to provide a washer of the character described in which the thicker portion is nonflat being either cup shaped or sinuous annularly so as to provide for springiness in an axial direction, and in which the inner thin part can center on the small diameter portion of a shoulder rivet, while the thicker outer annular portion of the washer may surround the larger diameter portion of the rivet. These thin portions being centered on the small diameter portion of a shoulder rivet prevent the washers from moving sideways or becoming offset. The thin portions may be torn off during the riveting operation or fold over or become inactive as a result of the assembly operation on the shoulder rivet. The inner thin portion may either be annular or may comprise tabs tangent to a circle of the diameter of the small diameter portion of the rivet, and the thin portion may either be flat in a single plane or it may be inclined to the axis of the washer. With such construction the washer may be used with either face up. When the thinner or fin portion is inclined to the axis of the washer it helps prevent the flattening out of the washer as a whole to insure springiness. The thin or fin portion of the washer may comprise portions having arcuate inner edges to engage opposed portions of the small diameter part of the rivet, to thereby center the washer on said part. Furthermore the thinner, inner or finned portion of the washer may be located adjacent to the top or bottom surface of the washer or may be spaced between the top and bottom surfaces thereof.

A further object of this invention is to provide the combination of a pair of links joined together by a shoulder rivet with a washer on the rivet and between the links, with the washer having an outer annular thicker part adapted to surround the thicker part of the rivet and a thinner inner part to center on the smaller annular portion of the rivet.

Yet a further object of this invention is to provide a strong, durable construction of the character described which shall be relatively inexpensive to manufacture, easy to assemble and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

BRIEF DESCRIPTION OF THE DRAWING

In the accompanying drawing, in which are shown various illustrative embodiments of this invention, FIG. 1 is an exploded perspective view illustrating the method of assembling a pair of links with a rivet and the washer embodying the invention;

FIG. 2 is a vertical cross section view showing the part shown in FIG. 1 in a position just prior to the downward clinching movement of the rivet;

DESCRIPTION OF THE PREFERRED EMBODIMENTS

Figure 3:
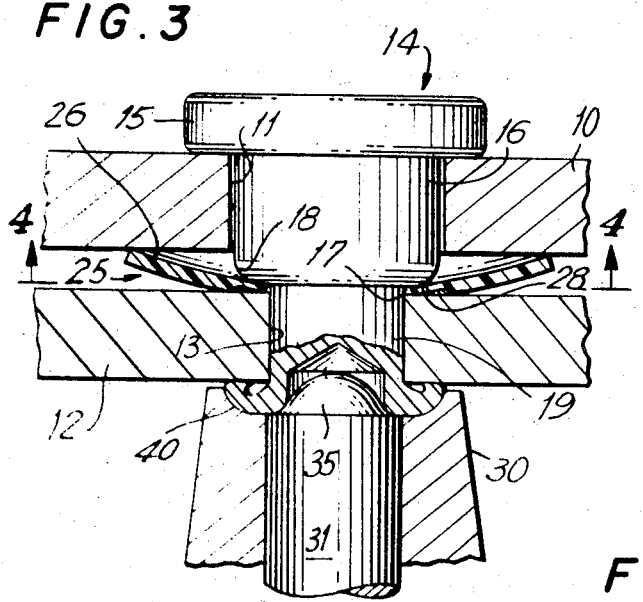
FIG. 3 is a partial view of the structure shown in FIG. 2 with the rivet in full riveted condition and showing the washer of FIGS. 1 and 2 in reverse position.
Figure 4:
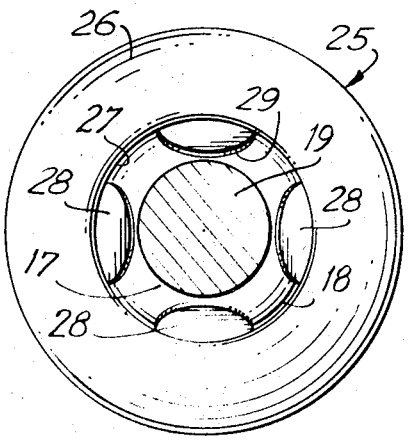
FIG. 4 is a cross-sectional view taken on line 4-4 of FIG. 3.

Referring now in detail to the drawing, 10 designates an upper link formed with an opening 11 of larger diameter and 12 designates a lower link provided with an opening 13 of smaller diameter. Said links are to be riveted together by a shoulder rivet 14. The rivet 14 is of usual construction and has an enlarged flanged head 15. Extending from the head 15 is a portion 16 of larger diameter formed with an under shoulder 17. The periphery of the shoulder 17 is formed with a lead or taper 18. Extending downwardly from the portion 16 of larger diameter, is a portion 19 of smaller diameter, formed with a central socket 20 at its underside.

In FIGS. 1 and 2 there is shown a washer 25 embodying the invention. The washer 25 has an outer annular thicker portion 26 of part-spherical cross-sectional shape or cupped or tapered shape. The washer 25 is shown in FIGS. 1 and 2 with the concave side at the bottom and its convex side at the top. The outer annular portion 26 has an inner edge 27 which is of a diameter slightly greater than the diameter of the thicker portion 16 of the rivet. Extending inwardly from the edge 27 are a plurality of thinner fins or tabs 28. Although four such tabs are shown, it will be understood that three or more such tabs can be used. These tabs 28 have inner curved edges 29. They may be inclined downwardly as shown in FIGS. 1 and 2 and they are shown to extend from the concave surface of the thicker portion 26 of the washer. The washer is made of resilient plastic material such as Celcon made by Celanese Corp. being acetal copolymer, or Delrin made by Dupont Co. being acetal polymer. Other materials which may be used is a material known by the name of Lexan made by General Electric Company being polycarbonate. Another polycarbonate which can be used is Merlon made by Mobey Chemical Co. of Pittsburg, Pa. Any synthetic plastic of low coefficient of friction and having good resilient qualities and good wear characteristics may be used.

The edges 29 are tangent to a circle concentric with the thicker portion 26, and of a diameter substantially equal to the diameter of the opening 13 in link 12, or the outer diameter of the tenon or smaller diameter portion 19 of the rivet.

In FIG. 2 of the drawing part of a riveting machine is shown, comprising a fixed body 30 in which a spring pressed plunger 31 is mounted. At the upper end of the body 30 is a socket 32 of curved cross section. The plunger 31 has a domed top end 35. Normally, the plunger 31 is pressed upwardly by a coil compression spring 36 in body 30, acting on a collar 37 on the plunger to raise the dome shaped portion 35 upwardly. The lower link 12 is first placed in position on top of the upper end of body 30, with the plunger 31 passing upwardly through the opening 13. Then the washer 25 is placed over the plunger 31 and on link 12, with the plunger passing through the central opening in the washer. The washer 25 may be placed with the concave side downwardly as shown in FIG. 2, or with the concave side facing upwardly as in FIG. 3. Then the link 10 is placed in position on the washer with the plunger 31 passing upwardly through the opening 11.

Mechanism (not shown) is provided to hold each rivet in position above the plunger 31. The dome part 35 of the plunger is close to the socket 20. The rivet is then depressed by usual press means causing the plunger 31 to be depressed and the tenon 19 then moves downwardly through the openings 11 and 13 and through the central opening in the washer. The tabs 28 center the washer on the tenon 19. As the rivet is pressed downwardly, the socketed portion of the rivet is riveted over or curled and the tenon is staked or tightly anchored to the lower link 12.

The lead or tapered portion 18 at the shoulder 17 of the larger diameter portion 16 of the rivet, may tear away the tabs 28 or distort them or deactivate them during the riveting operation. With this construction the washer 25 cannot become offset and the thicker portion 26 of the washer which is the active part of the washer, cannot be caught beneath the shoulder 17.

The washer is a combination spring and bearing washer. The diameter of the inner edge 27 clears the large diameter portion of the shoulder rivet. The fins or tabs or thinner portions 28 are thin enough so that they do not constitute part of the active spring washer, but are just sufficient to center the washer around the tenon. The thicker portion 26 of the washer as a result will center around the greater diameter portions 16 of the shoulder rivet. The fins or tabs can be torn away or folded over as a result of the assembly operation of the shoulder rivet.

In a practical embodiment, the thicker portion can be 0.030 to 0.035 inch thick. The fins 28 are 0.007 to 0.012 inch thick. Preferably the fins are flush with the concave side of the cupped washers, although they could be at the other side or in the middle as will be explained hereinafter. The shoulder rivets have a lead or chamfer or radius. This lead is necessary in order to use standard rivet clinching machines for the assembly of different or other similar rivets. When the plug or plunger 31 is all the way down the surrounding socketed portion 32 of the body becomes one solid unified anvil with the upper part of the plunger, which makes the semitubular end of the rivet curl into a curved head, as shown at 40 in FIG. 3. The lead or chamfer at the shoulder also aids the larger diameter position of the shoulder rivet to enter larger opening in the upper link. The lead will push the upper link sideways and center the rivet. The lead also creates a certain amount of space for the fins with either the concave side up or down. The thicker portion 26 of the washer will not get entrapped or damaged by the rivet shoulder during assembly. The fins provide the centering action on the centering pin or plunger 31 of the anvil or body 30 and also center the washer on the rivet to keep the thicker portion 26 out from under the shoulder of the rivet. The space between the around the fins or tabs can serve as an added reservoir for lubricant. This same washer 25 may be used with straight semitubular rivets, and here too an advantage will be obtained by reason of space adjacent to the rivet body for lubricant for extending the life of the pivotal connection. The purpose of the inclination of tabs 28 is to help the washer to retain its resiliency so that it is not too easily pushed into flat condition.

If a shoulder rivet is held with the head down, one link can be mounted by hand on the thick part of the rivet, then the washer is placed on the upper end of the rivet with the fins centering the washer on the tenon, and with the thick annular part of the washer surrounding the thick part of the rivet. In such case the lead on the shoulder of the rivet is not necessary. Then the second link is placed over the tenon and the tenon is then staked or anchored.

While a shoulder rivet is shown, it will be understood that any suitable pivot or pivot fastener may be employed such as a shoulder rivet, screw, or stud, or bolt.

In FIG. 3 the shoulder rivet 14 is shown staked to the lower link 12.

Figure 5:
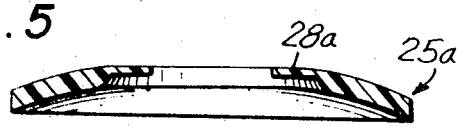
FIG. 5 is a vertical axial cross-sectional view of a modified form of the washer.

In FIG. 5 there is shown a washer 25a similar to the washer 25 except that the tabs 28a are at the convex side of the washer instead of the concave side.

Figure 6:
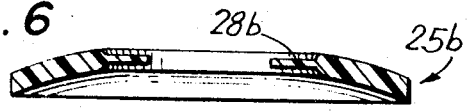
FIG. 6 is a view similar to FIG. 5 and illustrating a modified construction.

In FIG. 6 there is shown a washer 25b embodying the invention and showing the fins or tabs 28b spaced from both the concave and convex sides of the washer.

Figure 7:
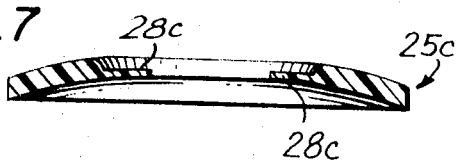
FIG. 7 is a view similar to FIG. 6 and showing a further modified construction.

In FIG. 7 there is shown a washer 25c embodying the invention. Here the tabs 28c are shown flat and coplanar instead of being inclined to the axis.

Figure 8:
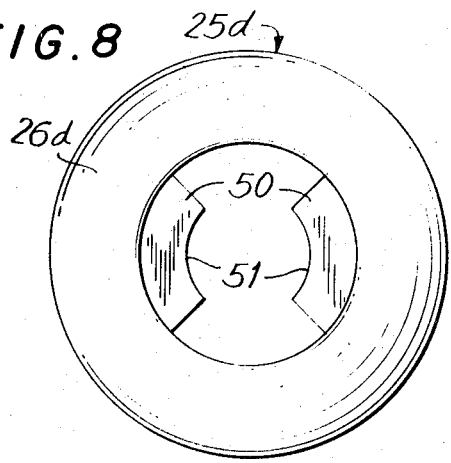
FIG. 8 is a top plan view of a washer embodying the invention and illustrating another modified construction.

In FIG. 8 there is shown a washer 25d in which the outer thicker part 26d is similar to the thicker part 26. Instead of the tabs 28, however, there are a pair of fins 50 which are diametrically opposed, and which have inner arcuate edges 51 to center the washer on the small part of the rivet. The fins 50 may either be at the concave side of the washer or at the convex end between the two.

Figure 9:
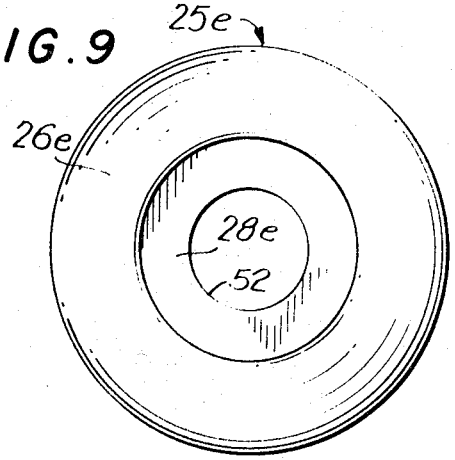
FIG. 9 is a view similar to FIG. 8 and showing still another form of washer embodying the invention.

In FIG. 9 there is shown a washer 25e illustrating another form of the invention. The washer 25e has an outer thick part similar to the thick part 26 of the washer 25. However, the thin portion 28e is annular all around and has an inner edge 52 which is circular and which centers the washer on the rivet.

Figure 10:
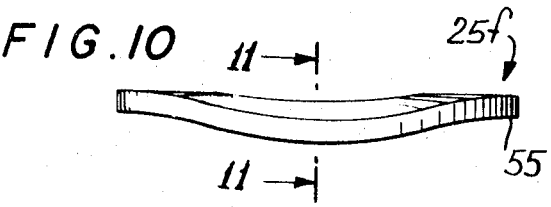
FIG. 10 is a front elevational view of a washer embodying still another modification.
Figure 11:
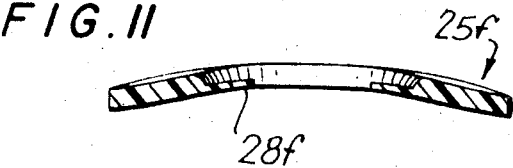
FIG. 11 is a cross-sectional view taken on line 11-11 of FIG. 10.

In FIGS. 10 and 11 there is shown a washer 25f embodying still another form of the invention. The washer 25f has an outer thicker part 55 which is sinuous all around and has thin fins 28f which may be flat and at one side of the washer or at the other end or in the middle. The fins or tabs 28f may be inclined to the axis of the washer like the fins or tabs 28 of FIG. 2. Also the fins 28f may be replaced by fins 50 of FIG. 8, or by a circular thinned portion 28e of FIG. 9.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

I claim:

1. In combination, a pair of members having aligned openings, a pivot passing through said openings, to pivotally connect said members, a washer interposed between said members, said washer having an outer annular portion, and an inner portion extending inwardly from said outer portion, and said washer being formed with a central opening, said inner portion of said washer being thinner than said outer portion and having centering means, said pivot passing through said opening in said washer, and said centering means of said washer centering said washer on said pivot, the opening in one of said members being of larger diameter than the opening in the other member, said pivot comprising a shoulder pivot having a portion of greater diameter and a portion of lesser diameter, said portions of greater and less diameter of said pivot being received in the greater and lesser diameter openings of said members, respectively, and said pivot having a shoulder between said portions of said pivot, contacting said inner portion of said washer, said centering means having means to center on the portion of lesser diameter of said pivot during assembly of said pivot with said members and washers.

2. The combination of claim 1, and means to anchor said portion of lesser diameter of said pivot to the member with the opening of lesser diameter.

3. The combination of claim 1, said outer portion having an inner diameter slightly greater than the diameter of the portion of larger diameter of the pivot.

4. In combination, a pair of members having aligned openings, a pivot passing through said openings, to pivotally connect said members, a washer interposed between said members, said washer having an outer annular portion, and an inner portion extending inwardly from said outer portion, and said washer being formed with a central opening, said inner portion of said washer being thinner than said outer portion and having centering means, said pivot passing through said opening in said washer, and said centering means of said washer centering said washer on said pivot, the height of said outer portion being greater than the thickness of said outer portion of the washer, and said washer being resilient in an axial direction, said inner portion comprising more than two tabs having inner rounded edges tangent to a circle of a diameter substantially equal to the diameter of the portion of the pivot on which the washer is centered, the opening in one of said members being of larger diameter than the opening in the other member, said pivot comprising a shoulder pivot having a portion of greater diameter and a portion of lesser diameter, said greater diameter and lesser diameter portions of said pivot being received in the greater and lesser diameter openings of said members, respectively, and said pivot having a shoulder between said portions of said pivot, contacting said inner portion of said washer, said centering means having means to center on the portion of lesser diameter of said pivot during assembly of said pivot with said members and washer.

5. The combination of claim 4, said tabs being inclined to the axis of said washer.